No. 653,763. Patented July 17, 1900.
H. J. BREWER.
ELECTROGALVANIC BATTERY.
(Application filed July 7, 1899.)

(No Model.) 2 Sheets—Sheet 1.

Witnesses:
O. W. Gardner
Louis Rowley

Inventor:
Horatio J. Brewer
By his Attorney
George William Miatt

THE NORRIS PETERS CO., PHOTO-LITHO., WASHINGTON, D. C.

No. 653,763. Patented July 17, 1900.
H. J. BREWER.
ELECTROGALVANIC BATTERY.
(Application filed July 7, 1899.)

(No Model.) 2 Sheets—Sheet 2.

Witnesses:
D. W. Gardner
Louis Rowley

Inventor:
Horatio J. Brewer
By his Attorney
George William Miatt

THE NORRIS PETERS CO., PHOTO-LITHO., WASHINGTON, D. C.

UNITED STATES PATENT OFFICE.

HORATIO J. BREWER, OF NEW YORK, N. Y.

ELECTROGALVANIC BATTERY.

SPECIFICATION forming part of Letters Patent No. 653,763, dated July 17, 1900.

Application filed July 7, 1899. Serial No. 723,055. (No model.)

*To all whom it may concern:*

Be it known that I, HORATIO J. BREWER, a citizen of the United States, residing in the city, county, and State of New York, have invented certain new and useful Improvements in Electrogalvanic Batteries, of which the following is a specification, sufficient to enable others skilled in the art to which the invention appertains to make and use the same.

Although applicable to galvanic batteries of other forms, my invention is shown and described herein as relating more particularly to the class of such batteries in which the conducting or electronegative element consists of a carbon electrode having conglomerate material—such as peroxid of manganese, carbon, &c.—attached thereto, as in the Leclanché battery, and is designed to afford a more perfect, permanent, and rigid connection between the carbon electrode and its conductor, while isolating and protecting the connecting parts from the action of the salts resulting from chemical reaction in the battery.

The invention consists in the special construction, combination, and arrangement of parts hereinafter described and claimed specifically.

Figure 1:
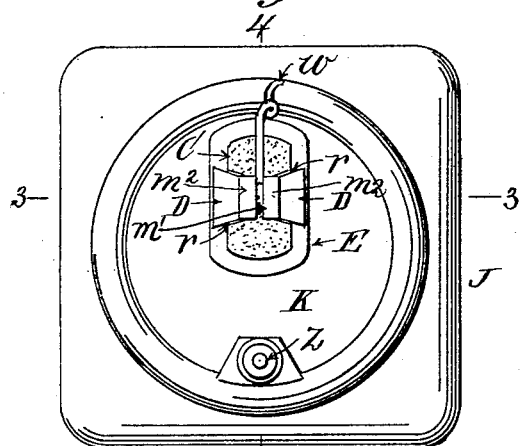
Figure 2:
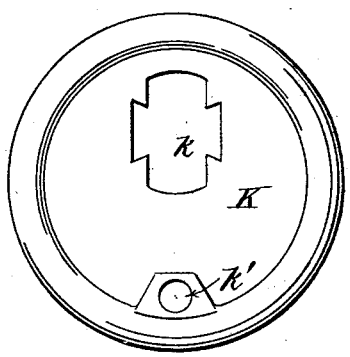
Figure 3:
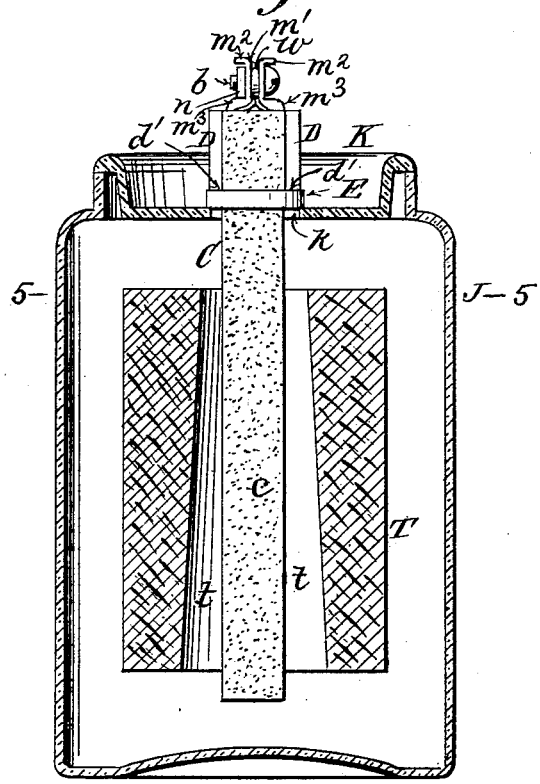
Figure 4:
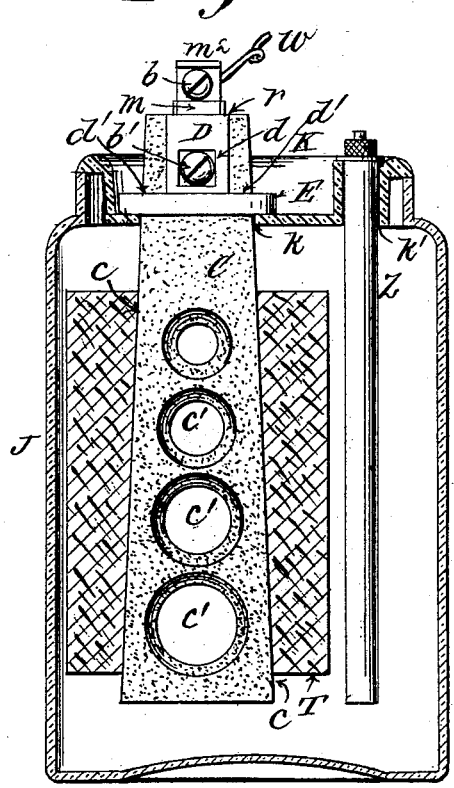
Figure 5:
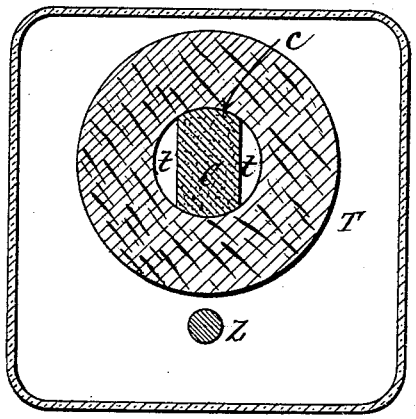
Figure 7:
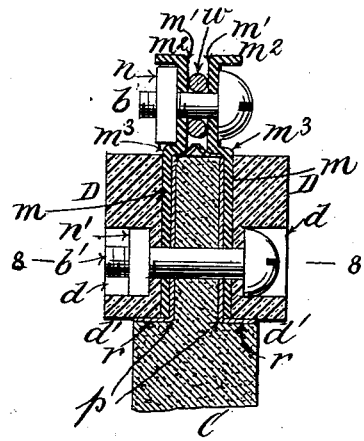
Figure 6:
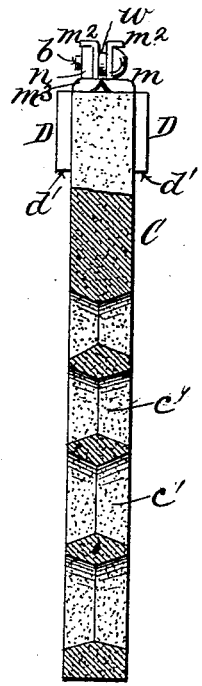
Figure 8:
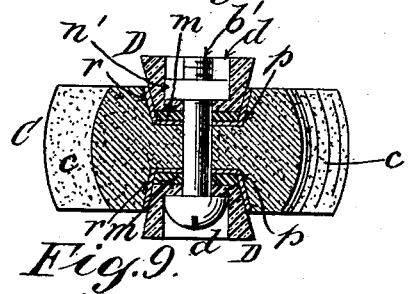
Figure 9:
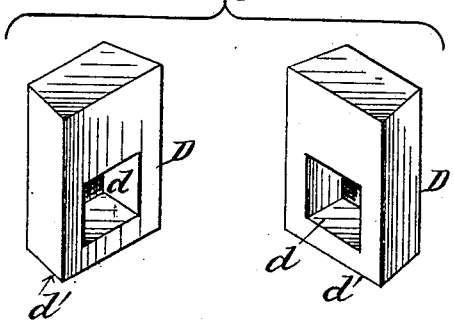

In the accompanying drawings, Figure 1 is a top view of a battery embodying my improvements. Fig. 2 is a top view of the cover thereof. Fig. 3 is a sectional elevation on plane of line 3 3, Fig. 1. Fig. 4 is a similar view upon plane of line 4 4, Fig. 1. Fig. 5 is a horizontal section upon plane of line 5 5, Fig. 3. Fig. 6 is a horizontal section of the body of the carbon electrode, the upper portion thereof being shown in elevation. Fig. 7 is a sectional view, upon an enlarged scale, of the upper end of the carbon and connections; Fig. 8, a transverse section upon plane of line 8 8, Fig. 7; Fig. 9, isometrical views of the insulating and supporting blocks.

J represents the ordinary glass jar of a battery, the mouth of which is closed by a cover K, formed with openings $k$ $k'$ for the upper ends, respectively, of the carbon or negative electrode C and the zinc or positive electrode Z. At its upper extremity the opposite sides of the carbon electrode C are formed with recesses $r$ $r$, into which fit strips of zinc $m$ $m$, between the projecting ends $m'$ $m'$ of which the wire $w$ or other form of conductor is clamped by means of the bolt $b$ and nut $n$. The extreme outer ends of said zinc strips $m$ $m$ may be bent outward at right angles to stiffen the clamping-jaws $m'$ $m'$, also constituting shoulders $m^2$ $m^2$, which may be utilized in locking the nut $n$ against rotation upon the bolt $b$. Strips $p$ $p$ of metal of relatively-low electropositive properties may be interposed between the clamping-strips $m$ $m$ and the carbon C, if desired, to prevent chemical action between the zinc strips $m$ $m$ and the carbon of the electrode, although this feature forms no part of my invention. The clamping-strips $m$ $m$ are secured to the carbon C by means of a bolt $b'$ and nut $n'$, the bolt $b'$ passing through the carbon and clamping-strips and engaging with the nut upon the opposite side, as will be readily seen by reference to Figs. 7 and 8, by which also it will be seen that the nut $n'$ and head of the bolt $b'$ rest in sockets $d$ $d$, formed in cheek-pieces D D, which fit within the recesses $r$ $r$ in the head of the carbon plate C. The strips $m$ $m$ are bent inward to form shoulders $m^3$ $m^3$, which stiffen the clamping-jaws $m'$ $m'$, laterally press down the carbon, and make the connection more rigid. These bends or shoulders $m^3$ $m^3$ may also be utilized to prevent the turning of the nut $n$.

The cheek-pieces D D are made of hard rubber, fiber, or other suitable insulating material and abut against the metallic strips $m$ $m$. They are made of sufficient thickness to project beyond the sides of the carbon C when secured thereto, so as to form shoulders $d'$ $d'$, which engage with a sustaining-collar E, interposed between them and the upper surface of the cover K, the head of the carbon, with the cheek-pieces D D in place, being inserted through the opening $k$ in the cover K and the collar E being then adjusted around the neck of the carbon below the cheek-pieces D D. The collar E may consist of a rubber band which may be slipped over the head of the carbon, of a bifurcated washer of hard material, as in my concurrent application, Serial No. 723,056, filed July 7, 1899, or of any suitable mechanical expedient interposed between the shoulders $d'$ $d'$ and the cover K. In either case the collar sustains the weight of the carbon and connections, including that of the tubiform depolarizer T, suspended upon the carbon C, the collar being in turn sustained by the cover K.

By filling the sockets $d\,d$ with wax or other non-absorbent material after the bolt $b'$ and nut $n'$ are sucured in position I completely insulate and protect said bolt and nut and the portions of the metallic strips $m\,m$ embedded in the carbon from contact with saline crystallizations, &c., emanating from the battery. By securing the conducting strip or wire $w$ between the opposite upper portions or clamps $m'\,m'$ of the metallic strips $m\,m$ I attain a more perfect and rigid contact, both electrically and mechanically, and maintain the connections by means of the overlapping end $m^2$, which locks the nut $n$ in position.

The form of the carbon plate C and of the conglomerate T, suspended thereon, has no relation to my present invention. In the accompanying drawings as a matter of convenience I show a tubiform depolarizer T, cylindrical in external form and having a conical central bore corresponding in inclination to the converging sides $c\,c$ of the carbon plate C, thus creating internal vertical passages $t\,t$ within the electronegative element for the circulation of the exciting liquid and the escape of the hydrogen and other gaseous products, as fully set forth and claimed in my concurrent application, Serial No. 737,076, filed November 15, 1899, as a subdivision of this present application. If desired, the carbon plate C may be formed with lateral openings or passages $c'$ to still further promote circulation and depolarization.

It will thus be seen that I attain herein a positive, intimate, and rigid connection between the carbon electrode and its conductor, at the same time effectually protecting all the parts against corrosive action, while insuring and maintaining a relatively-high degree of conductivity.

What I claim as my invention, and desire to secure by Letters Patent, is—

1. In a galvanic battery, the combination with the carbon electrode of the two metallic strips $m$, $m$, countersunk in part into the carbon, and the bolt $b$, and nut $n$, for clamping a conductor between the projecting ends of said metallic strips $m$, $m$, substantially as set forth.

2. In a galvanic battery, the combination with the carbon electrode, of the metallic strips $m$, $m$, countersunk in part into the carbon and formed with the projecting clamps $m'$, $m'$, having their ends $m^2$, $m^2$, bent outward laterally and the bolt $b$, and nut $n$, for clamping a conductor between the said projecting clamps $m'$, $m'$, of the said metallic strips $m$, $m$, substantially as set forth.

3. In a galvanic battery, the combination with the carbon electrode, of the metallic strips $m$, $m$, countersunk in part into the carbon, and formed with the shoulders $m^3$, $m^3$, and projecting clamps $m'$, $m'$, and the bolt $b$, and nut $n$, for securing the conductor between the said projecting clamps, substantially in the manner and for the purpose described.

4. In a galvanic battery, the combination with the carbon electrode formed with the recesses $r$, $r$, of the metallic strips $m$, $m$, countersunk in part into the carbon, the bolt $b$, and nut $n$, for clamping a conductor between the projecting ends of said metallic strips $m$, $m$, the cheek-pieces D, D, of insulating material fitting in part within the recesses $r$, $r$, in the carbon, and projecting beyond the latter to form shoulders $d'$, $d'$, the bolt $b'$, and nut $n'$, for securing the cheek-pieces to the carbon, the cover K, formed with the opening $k$, for the carbon, and a collar E fitting between the shoulders $d'$, $d'$, and the top of the cover K, for the purpose and substantially in the manner described.

5. In a galvanic battery, the combination with the carbon electrode of a metallic strip $m$, countersunk in part into the carbon, a bolt $b$, and nut $n$, for clamping a conductor to said metallic strip, cheek-pieces D, D, of non-conducting material secured to the carbon by a bolt $b'$, and nut $n'$, and projecting beyond the carbon to form shoulders $d'$, $d'$, the cover K, formed with the opening $k$, and a collar E fitting between said shoulders $d'$, $d'$, and the top of the cover K, for the purpose and substantially in the manner set forth.

6. In a galvanic battery the combination with the carbon electrode of the metallic strips $m$, $m$, countersunk in part in the recesses $r$, $r$, in the carbon, the bolt $b$, and nut $n$, for clamping a conductor between the projecting ends of said metallic strips $m$, $m$, the cheek-pieces D, D, formed of non-conducting material with sockets $d$, $d$, said cheek-pieces fitting into the recesses $r$, $r$, in the carbon and projecting beyond the same to form shoulders $d'$, $d'$, the bolt $b'$, and nut $n'$, fitting in the sockets $d$, $d$, and securing the cheek-pieces and metallic strips to the carbon, the cover K, formed with the opening $k$, and the collar E, fitting between said shoulders $d'$, $d'$, and the top of the cover, substantially as and for the purpose described.

HORATIO J. BREWER.

Witnesses:
D. W. GARDNER,
GEO. WM. MIATT.